(12) United States Patent
Reiter et al.

(10) Patent No.: US 7,059,548 B2
(45) Date of Patent: Jun. 13, 2006

(54) FUEL INJECTION VALVE WITH A DAMPING ELEMENT

(75) Inventors: Ferdinand Reiter, Markgröningen (DE); Ulrich Fischer, Ditzingen (DE); Franz Thömmes, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 10/332,567

(22) PCT Filed: Apr. 23, 2002

(86) PCT No.: PCT/DE02/01476

§ 371 (c)(1),
(2), (4) Date: Apr. 9, 2003

(87) PCT Pub. No.: WO02/090757

PCT Pub. Date: Nov. 14, 2002

(65) Prior Publication Data

US 2003/0155448 A1 Aug. 21, 2003

(30) Foreign Application Priority Data

May 9, 2001 (DE) .......................... 101 22 353

(51) Int. Cl.
*B05B 1/30* (2006.01)
*F02M 51/00* (2006.01)

(52) U.S. Cl. .................... 239/585.1; 239/900
(58) Field of Classification Search ............. 239/585.1, 239/585.2, 585.3, 585.4, 585.5, 900
See application file for complete search history.

(56) References Cited

U.S. PATENT DOCUMENTS

| 5,383,606 | A | * | 1/1995 | Stegmaier et al. ........... 239/575 |
| 5,749,527 | A | * | 5/1998 | Fujikawa et al. ......... 239/585.3 |
| 5,829,688 | A | * | 11/1998 | Rembold et al. ......... 239/585.1 |
| 6,474,572 | B1 | * | 11/2002 | Tsuchiya et al. ......... 239/585.1 |

FOREIGN PATENT DOCUMENTS

| DE | 14 50 446 | 11/1968 |
| DE | 24 61 309 | 7/1975 |
| DE | 38 74 957 | 11/1988 |
| DE | 40 38 142 | 4/1992 |
| DE | 41 23 787 | 1/1993 |
| DE | 196 01 019 | 7/1997 |
| DE | 196 26 576 | 1/1998 |
| DE | 37 45 105 | 10/1998 |
| DE | 198 26 011 | 12/1998 |
| DE | 696 05 168 | 4/2000 |
| EP | 0 290 787 | 11/1988 |
| EP | 0 767 304 | 4/1997 |
| EP | 0 780 569 | 6/1997 |
| EP | 0 911 512 | 4/1999 |
| FR | 1 536 140 | 8/1968 |
| WO | WO 02 10583 | 2/2002 |

* cited by examiner

*Primary Examiner*—Christopher Kim
(74) *Attorney, Agent, or Firm*—Kenyon & Kenyon

(57) ABSTRACT

A fuel injector with a magnetic coil which cooperates with an armature acted upon by a restoring spring, the armature forming an axially movable valve part with a valve needle. A valve-closure member which forms a sealing seat with a valve-seat member is provided at the valve needle. At least one damping element is disposed in an opening of the fuel injector through which fuel flows.

11 Claims, 2 Drawing Sheets

FUEL INJECTION VALVE WITH A DAMPING ELEMENT

FIELD OF THE INVENTION

The present invention relates to a fuel injector.

BACKGROUND INFORMATION

German Published Patent Application No. 196 26 576 describes an electromagnetically actuable fuel injector, in which, for the electromagnetic actuation, an armature cooperates with an electrically energizable magnetic coil, and the lift of the armature is transmitted to a valve-closure member via a valve needle. The valve-closure member cooperates with a valve-seat surface to form a sealing seat. A plurality of fuel channels is provided in the armature. The armature is reset by a resetting spring.

The fuel injector described in German Published Patent Application No. 196 26 576, provides that pressure pulsations which are predominantly caused by the cyclical opening and closing of the fuel injector, are transmitted undamped to other parts of the fuel injection system, such as to the fuel distributor line, thereby causing resonances that lead to disturbing noise emissions during operation of the fuel injector.

Due to resonances, it is also possible that, due to vibrations, connections between components are severed, which may cause error functions of the fuel injection system and even the internal combustion engine, thereby adversely affecting operating safety.

SUMMARY OF THE INVENTION

In contrast, the fuel injector according to the present invention provides that at least one damping element, disposed in a recess of the fuel injector, damps the pressure pulsations caused by the valve-needle movement in such a manner that no resonances occur in the fuel-distributor line and the noise emission is reduced.

The damping element, configured in the form of a screen, is disposed on the downstream side of a filter element, so that impurities carried along by the fuel are filtered out and are unable to clog the bore of the flap.

The screen with the bore is able to be produced in a simple manner and is easy to install in the recess during installation of the fuel injector.

In the case of fuel injectors having a longer configuration, a plurality of damping elements may be used, which are able to enhance the damping characteristics, for example, as a result of differing axial lengths.

When using a plurality of damping elements, the bore may be larger, since the damping is increased by a larger length of the component. This makes it possible for the damping elements to be disposed on the inflow side of the filter element as well, this may allow an easier installation or the possibility of retrofitting fuel injectors that are already in operation.

The use of a throttle-type damping element makes it possible to achieve a very effective damping through suppression of the resonances by elastic elements and insets being inserted into one another in the damping element.

DETAILED DESCRIPTION

Figure 1:
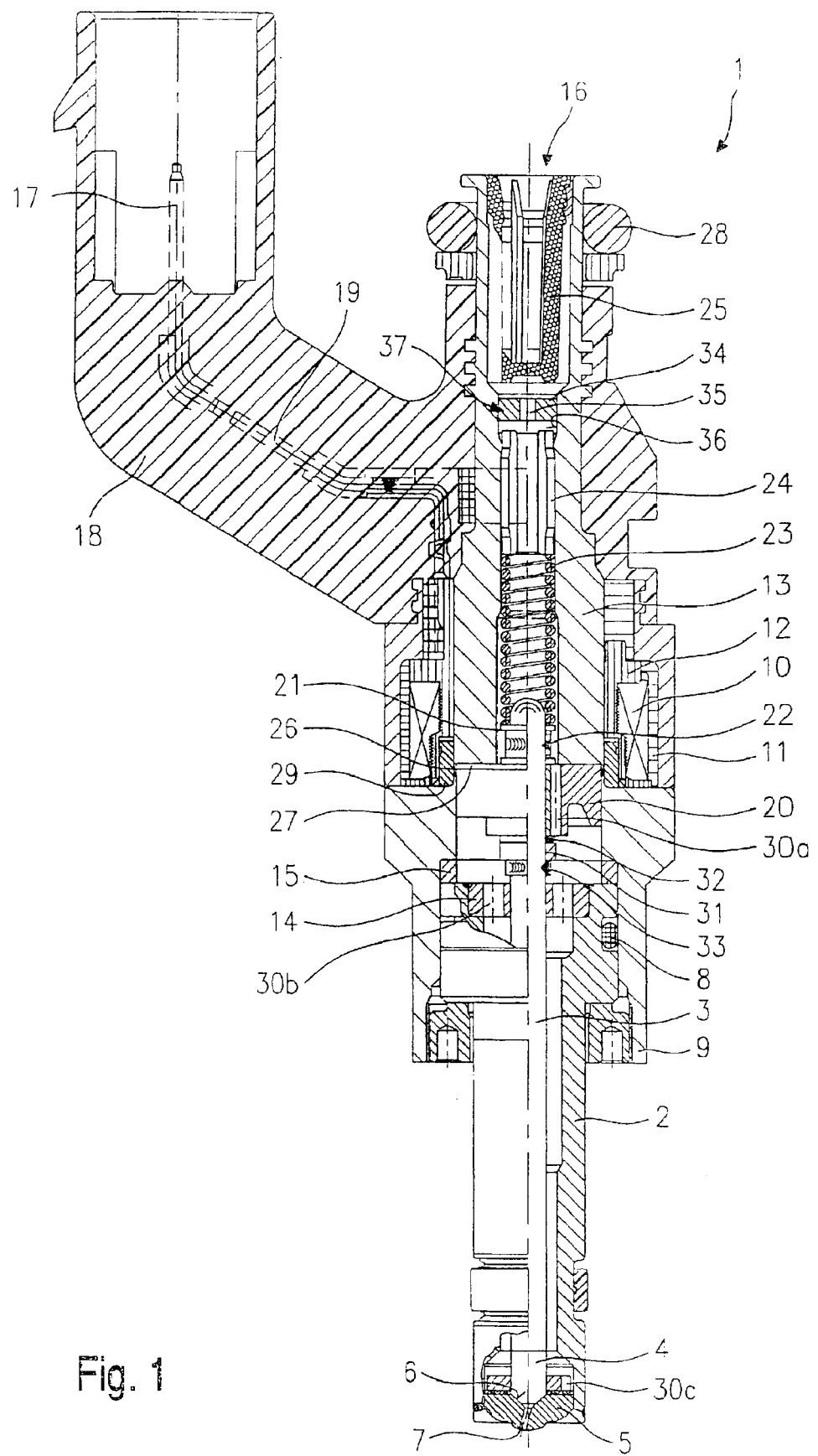
FIG. 1 shows a schematic section through a first example embodiment of a fuel injector according to the present invention.

FIG. 1 shows a part-sectional representation of a first example embodiment of a fuel injector 1 according to the present invention. It is in the form of a fuel injector 1 for fuel-injection systems of mixture-compressing internal combustion engines having external ignition. Fuel injector 1 is suited for the direct injection of fuel into a combustion chamber (not shown) of an internal combustion engine.

Fuel injector 1 includes a nozzle body 2 in which a valve needle 3 is positioned. Valve needle 3 is in operative connection with a valve-closure member 4, which cooperates with a valve-seat surface 6 disposed on a valve-seat member 5 to form a sealing seat. In the example embodiment, fuel injector 1 is an inwardly opening fuel injector 1 which includes a spray-discharge orifice 7.

A seal 8 seals nozzle body 2 from an outer pole 9 of a magnetic coil 10. Magnetic coil 10 is encapsulated in a coil housing 11 and wound on a coil brace 12, which rests against an inner pole 13 at magnetic coil 10. Inner pole 13 and outer pole 9 are separated from one another by a gap 26 and are braced against a connecting member 29. Magnetic coil 10 is energized via an electric line 19 by an electric current, which may be supplied via an electrical plug contact 17. A plastic coating 18, which may be extruded onto inner pole 13, encloses plug contact 17.

Valve needle 3 is guided in a valve-needle guide 14, which is disk-shaped. A paired adjustment disk 15 is used to adjust the (valve) lift. An armature 20 is on the other side of adjustment disk 15. It is connected by force-locking to valve needle 3 via a first flange 21, and valve needle 3 is connected to first flange 21 by a welded seam 22. Braced against first flange 1 is a restoring spring 23 which, in the present configuration of fuel injector 1, is prestressed by a sleeve 24.

On the discharge-side of armature 20 is a second flange 31 which is used as lower armature stop. It is connected to valve needle 3 via a welding seam 33 in a force-locking fit. An elastic intermediate ring 32 is positioned between armature 20 and second flange 31 to damp armature bounce during closing of fuel injector 1.

Fuel channels 30a through 30c run through valve-needle guide 14, armature 20 and valve-seat member 5, conducting the fuel, supplied via a central fuel supply 16 and filtered by a filter element 25, to spray-discharge orifice 7. A seal 28 seals fuel injector 1 from a distributor line (not shown further).

In the rest state of fuel injector 1, restoring spring 23 acts upon first flange 21 at valve needle 3, contrary to its lift direction, in such a manner that valve-closure member 4 is retained in sealing contact against valve seat 6. Armature 20 rests on intermediate ring 32, which is supported on second flange 31. When magnetic coil 10 is energized, it builds up a magnetic field which moves armature 20 in the lift direction, against the spring tension of restoring spring 23. Armature 20 carries along first flange 21, which is welded to valve needle 3, and thus valve needle 3, in the lift direction as well. Valve closure member 4, being operatively connected to valve needle 3, lifts off from valve seat surface 6, and the fuel guided via fuel channels 30a through 30c to spray-discharge orifice 7 is sprayed off.

When the coil current is turned off, once the magnetic field has sufficiently decayed, armature 20 falls away from inner pole 13; due to the pressure of restoring spring 23 on first flange 21, whereupon valve needle 3 moves in a direction counter to the lift. As a result, valve closure member 4 comes to rest on valve-seat surface 6, and fuel injector 1 is closed. Armature 20 comes to rest against the armature stop formed by second flange 31.

According to the present invention, a screen 34, which is provided with a bore 35, is disposed in an opening 36 of inner pole 13. Screen 34 is arranged between filter element 25 and adjusting sleeve 24 downstream from filter element 25, thereby holding back impurities in the fuel flowing through filter element 25 and screen 34 as well, so that no clogging occurs at bore 35 of screen 34.

With the aid of screen 34, it is possible to prevent pressure pulsations from occurring during the operation of fuel injector 1. The pressure pulsations are caused, for instance, by the cyclical opening and closing of fuel injector 1, thereby subsequently causing noise problems in the distributor line (not shown further). The severing of plug-in connections between individual components due to excited oscillations may also be prevented by the damping of pressure pulsations.

In the first example embodiment, screen 34 is produced as a separate component and may be pressed into the recess of inner pole 13. However, it is also possible to implement screen 34, for instance, as a combined component with adjusting sleeve 24 or with filter element 25.

Bore 35 of screen 34 is dimensioned such that the pressure pulsations are effectively damped, but the fuel flow through fuel injector 1 is not restricted in the process. The stronger the damping of the pressure pulsations, the lower the resonance in the fuel-distributor line and the noise emissions it causes.

The choice of materials for producing screen 34 is determined by its stability with respect to the solvent quality of the fuel. Apart from metals and metal alloys which, due to the malleability of the material, facilitate mounting of screen 34 in opening 36 of the inner pole by pressing-in, spring steel sleeves or Teflon rings are conceivable, as are elastomers and combinations of different elastomers and combinations of elastomers and metals. The elastomers may include reinforced tissue or may be supplemented with fillers, such as glass fiber, glass beads, stone meal or powdered metal.

Figures 2, 3:
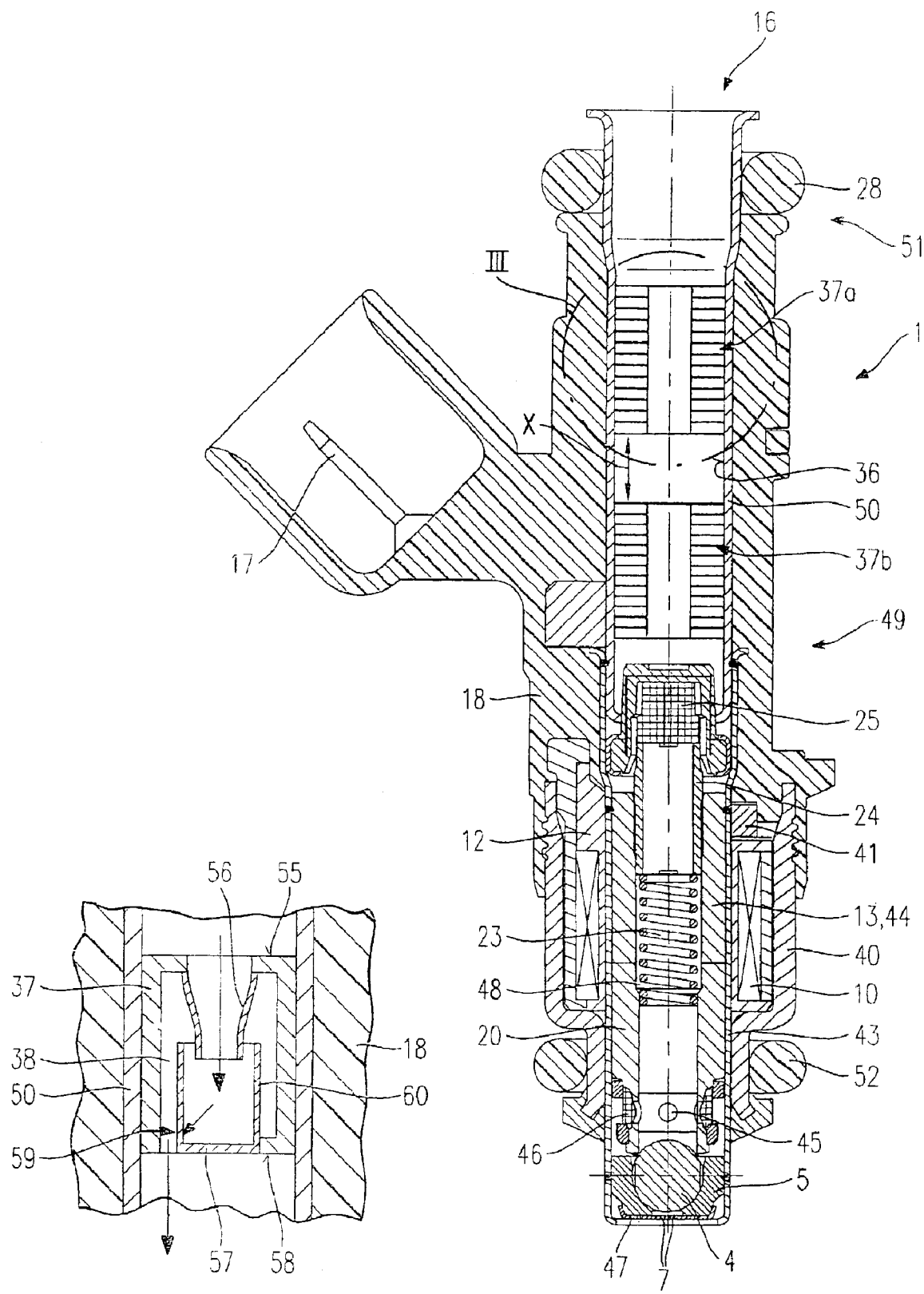
FIG. 2 shows a schematic section through a second example embodiment of a fuel injector according to the present invention.
FIG. 3 shows a part-sectional representation, in region III in FIG. 2, of a third example embodiment of a fuel injector configured according to the present invention.

FIG. 2 shows a part-sectional, schematic representation of a longitudinal section through a second example embodiment of a fuel injector 1 configured according to the present invention, which is suited for the injection of fuel into an intake manifold (not shown further) of an internal combustion engine. In FIG. 1 and FIG. 2, identical components are denoted by the same reference numerals.

Fuel injector 1 includes a magnetic coil 10 which is wound on a coil brace 12. Coil brace 12 is encapsulated in a valve housing 40 and sealed off by a lid 41.

Coil brace 12 is penetrated by a valve sleeve 43, which has a tubular configuration and includes a support tube 44 wedged or soldered therein, which is used as inner pole of magnetic coil 10. Valve housing 40, for example, may be used as outer pole of magnetic coil 10. Downstream from support tube 44 is an armature 20 which is configured in one piece with valve needle 3. Flow-through orifices 45 are provided in valve needle 3, which guide the fuel flowing through fuel injector 1 toward a sealing seat.

An annular filter 46 for filtering the fuel is disposed in the region of flow-through orifices 45. Valve needle 3 is in operative connection, e.g., by welding, with a valve-closure member 4 having a spherical shape in the example embodiment, valve-closure member 4 forming a sealing seat with a valve-seat member 5. Downstream from the sealing seat, at least one spray-discharge orifice 7 is formed in a spray-orifice plate 47, via which the fuel is injected into the intake manifold (not shown further).

In the rest state of fuel injector 1, armature 20 is acted upon by a restoring spring 23 in such a manner that fuel injector 1 is held closed by the contact pressure of valve-closure member 4 on valve-seat body 5. Restoring spring 23 is located in a recess 48 of armature 20 or support tube 44 and is prestressed by an adjusting sleeve 24. On the inflow side of adjusting sleeve 24, a cup-shaped filter element 25 may be pressed into valve sleeve 43. The fuel, which is supplied via a central fuel supply 16, flows through fuel injector 1 to the sealing seat and to spray-discharge orifice 7 through recess 48 and flow-through orifices 45.

A tubular metallic hollow body 50 is inserted into an inflow-side end 49 of valve sleeve 43 and welded to valve sleeve 43, for instance, in the region of filter element 25. To install a fuel-distributor line (not shown further), fuel injector 1 is provided with a seal 28 at an inflow-side end 51 of metallic hollow body 50. An additional seal 52 seals the connection (not shown further) between fuel injector 1 and the intake manifold. Magnetic coil 10 is energized via an electric line 19 by an electric current, which may be supplied via an electrical plug contact 17. Plug contact 17 is enclosed by a plastic coating 18 which may be sprayed onto valve sleeve 43 or onto hollow body 50.

If magnetic coil 10 is supplied with electric current via an electric line (not shown further), a magnetic field is built up which, if sufficiently strong, pulls armature 20 into magnetic coil 10, counter to the force of restoring spring 23, in the opposite direction of the fuel flow. This closes a working gap 27 formed between armature 20 and support tube 44.

The movement of armature 20 also carries along in the lift direction valve needle 3, which is formed in one piece with armature 20, so that valve-closure member 4 lifts off from valve-seat member 5 and fuel is guided to spray-discharge orifice 7.

Fuel injector 1 is closed as soon as the electric current energizing magnetic coil 10 is switched off and the magnetic field has decayed to such a degree that restoring spring 23 presses armature 20 away from support tube 44, thereby moving valve needle 3 in the flow-off direction, and causing valve-closure member 4 to rest on valve-seat member 5.

According to the present invention, at least one damping element 37 is disposed in metallic hollow body 50. In the present example embodiment, two damping elements 37a and 37b are provided to enhance the damping characteristics. Damping elements 37a and 37b have the same function as screen 34 shown in the first example embodiment in FIG. 1, in that they damp pressure pulsations mainly caused by the opening and closing of fuel injector 1 and by subsequent resonances in various parts of the fuel-distributor system.

Due to a greater axial overall length of damping elements 37a and 37b, which is the result of the greater overall length of fuel injector 1 and the thereby available space, a recess 38 of damping elements 37a and 37b may be larger than bore 35 described in FIG. 1, without this reducing the damping effect.

To prevent turbulence in the fuel flow, the form of damping elements 37a and 37b may vary. For instance, recess 38 may have a variable diameter across the axial length of damping element 37a and 37b; it may be beveled in the inflow region or include structures on the inner wall to facilitate the flow. Axial clearance X of damping elements 37a and 37b may be configured to be variable.

FIG. 3, in a part-sectional representation, shows a third example embodiment of a damping element 37 according to the present invention, which, for instance, is able to be inserted into metallic hollow body 50 of a fuel injector 1, which is described in greater detail in the description in connection with FIG. 2.

Damping element 37 includes at least one elastic element 56 or a plurality of elastic elements 56 in its recess 38, which are connected to an end 55 on the inflow side of damping element 37. These extend in a flow direction of the fuel into recess 38 and into a cup-shaped insert 57, which is disposed at a downstream end 58 of damping element 37 in recess 38 and is connected to damping element 37 in at least one place.

Cup-shaped insert 57 is open toward the inflow-side end 55 of damping element 37 and includes at least one flow-through orifices 59 or a plurality of flow-through orifices 59 in a wall 60 of insert 57.

The fuel flowing through fuel injector 1 enters damping element 37 at the inflow-side end 55 and is slightly constricted by a narrowing of recess 38 formed by elastic elements 56. The fuel presses elastic elements 56 radially toward the outside. The flow of fuel continues into cup-shaped insert 57, which is open in the inflow direction. Subsequently, the fuel first leaves insert 57 via flow-through orifices 59 in wall 60 of insert 57 and, finally, via damping element 37. Arrows indicate a possible route of the fuel through damping element 37.

The damping achieved by damping element 37 described in FIG. 3 is very effective since no oscillations propagate in the direction of fuel supply 16, due to insert 57 nesting in damping element 37 and elastic elements 56 nesting in insert 57, thereby greatly reducing the noise emission.

The present invention is not limited to the example embodiments shown and is also applicable, for instance, to fuel injectors 1 for mixture-compressing, self-ignitable internal combustion engines.

What is claimed is:

1. A fuel injector comprising:
    a restoring spring;
    a valve needle;
    an armature forming an axially movable valve part together with the valve needle, the armature being acted upon by the restoring spring;
    a magnetic coil that cooperates with the armature;
    a valve-seat member;
    a valve-closure member forming a sealing seat with the valve-seat member and being arranged at the valve needle; and
    at least one damping element arranged in an opening of the fuel injector through which a fuel flows;
    wherein the at least one damping element is provided at an inflow-side end with at least one elastic element that extends in a flow direction of the fuel into a recess of the at least one damping element.

2. The fuel injector of claim 1, wherein the at least one elastic element extends into a cup-shaped insert located at a downstream end of the at least one damping element, the cup-shaped insert being open towards the inflow-side end of the at least one damping element.

3. The fuel injector of claim 2, wherein the cup-shaped insert includes at least one flow-through orifice in a wall of the cup-shaped insert.

4. The fuel injector of claim 2, wherein the cup-shaped insert is connected to the at least one damping element.

5. The fuel injector of claim 1, wherein the at least one damping element is configured as a screen that includes a bore.

6. The fuel injector of claim 1, wherein the at least one damping element is arranged between a filter element and an adjusting sleeve for prestressing the restoring spring.

7. The fuel injector of claim 1, wherein the at least one damping element is arranged in a metallic hollow body extending the fuel injector on an inflow side.

8. The fuel injector of claim 7, wherein the at least one damping element includes two damping elements.

9. The fuel injector of claim 8, wherein an axial length of a first one of the two damping elements and an axial length of a second one of the two damping elements are different.

10. The fuel injector of claim 8, wherein an axial clearance between the two damping elements is variable.

11. A fuel injector comprising:
    a restoring spring;
    a valve needle;
    an armature forming an axially movable valve part together with the valve needle, the armature being acted upon by the restoring spring;
    a magnetic coil that cooperates with the armature;
    a valve-seat member;
    a valve-closure member forming a sealing seat with the valve-seat member and being arranged at the valve needle; and
    at least one damping element arranged in an opening of the fuel injector through which a fuel flows;
    wherein the at least one damping element is arranged in a metallic hollow body extending the fuel injector on an inflow side;
    wherein the at least one damping element includes two damping elements; and
    wherein the two damping elements are arranged on an inflow side of a filter element.

* * * * *